United States Patent

Brewster

[15] 3,637,934

[45] Jan. 25, 1972

[54] FACSIMILE DEVICE WITH PROVISIONS FOR DIRECT VIEWING OF AN INTERMEDIATE RECORD

[72] Inventor: Arthur Edward Brewster, Cheshunt, England

[73] Assignee: International Standard Electric Corporation, New York, N.Y.

[22] Filed: Dec. 13, 1968

[21] Appl. No.: 783,638

[30] Foreign Application Priority Data

Jan. 25, 1968 Great Britain........................3,894/68

[52] U.S. Cl..........................................178/6.6 A, 346/74 M

[51] Int. Cl....................H04n 1/28, G01d 15/12, G11b 5/52

[58] Field of Search...........178/6.6 A, 6.7; 346/74 M, 74 MP

[56] References Cited

UNITED STATES PATENTS 3,064,077 11/1962 Cary......................................178/6.6

2,575,742 11/1951 Baltin et al..............................178/6.6

2,826,634 3/1958 Atkinson et al.........................178/6.6

3,142,840 7/1964 Smith et al..............................346/74

3,216,020 11/1965 Earthman................................346/74

3,426,144 2/1969 Roth......................................178/6.6

*Primary Examiner*—Bernard Konick

*Assistant Examiner*—J. Russell Goudeau

*Attorney*—C. Cornell Remsen, Jr., Walter J. Baum, Percy P. Lantzy, Philip M. Bolton, Isidore Togut and Charles L. Johnson, Jr.

[57] ABSTRACT

The invention provides apparatus for displaying and printing information applied thereto via an image conversion system which forms part of the apparatus and which involves the mechanical scanning of a primary image by a detector unit. A magnetic recording head assembly mechanically coupled to the detector unit and electrically coupled to the image conversion system scans a magnetic recording surface in synchronism with the scanning action of the detector unit to build up a magnetic image subsequently displayed by dusting with magnetic powder which adheres to the magnetic image and which is wholly transferable therefrom to a permanent record. The primary and permanent images as viewed are the same way round.

26 Claims, 5 Drawing Figures

Inventor
ARTHUR E. BREWSTER
By [signature]
Attorney

Inventor
ARTHUR E. BREWSTER
By [signature]
Attorney

Inventor
ARTHUR E. BREWSTER
By [signature]
Attorney

FACSIMILE DEVICE WITH PROVISIONS FOR DIRECT VIEWING OF AN INTERMEDIATE RECORD

BACKGROUND OF THE INVENTION

The invention relates to apparatus for displaying and printing information applied thereto via an image conversion system which forms part of said apparatus, and which involves the mechanical scanning of a primary image by a detector unit.

SUMMARY OF THE INVENTION

The invention provides apparatus for displaying information applied thereto via an image conversion system which forms part of said apparatus and which involves the mechanical scanning of a primary image by a detector unit, wherein a recording head assembly which is mechanically coupled to said detector unit and which is electrically coupled to said system scans a primary display record surface of said apparatus in synchronism with the scanning action of said detector unit to form a pattern of charges thereon which is representative of said information, said pattern being presented to view as a two-dimensional image by depositing on said primary display record surface a medium which adheres to said pattern.

BRIEF DESCRIPTION OF THE DRAWINGS

The foregoing and other features according to the invention will be better understood from the following description with reference to the accompanying drawings; in which.

DESCRIPTION OF THE PREFERRED EMBODIMENTS

The apparatus according to the invention, for presenting in visible form to an observer information contained in a signal applied thereto, the information display being large, clearly legible and capable of rapid and semicontinuous change as the information received changes, and for obtaining permanent copies of the displayed information either continuously or at will, may be adapted for use with any line scanning or picture-forming equipment which inherently involves a mechanical scanning process, for example, as in an infrared line scan system which involves the mechanical scanning of a primary image by a detector unit, by mechanically coupling the scanning mechanism to a recording head so as to cause it to perform equivalent scans across a recording medium which is being moved in a direction perpendicular to the recording head scan, at a speed equivalent to either the frame scan rate or to the passage of the apparatus over the scanned area depending on the particular application.

Figure 1A:
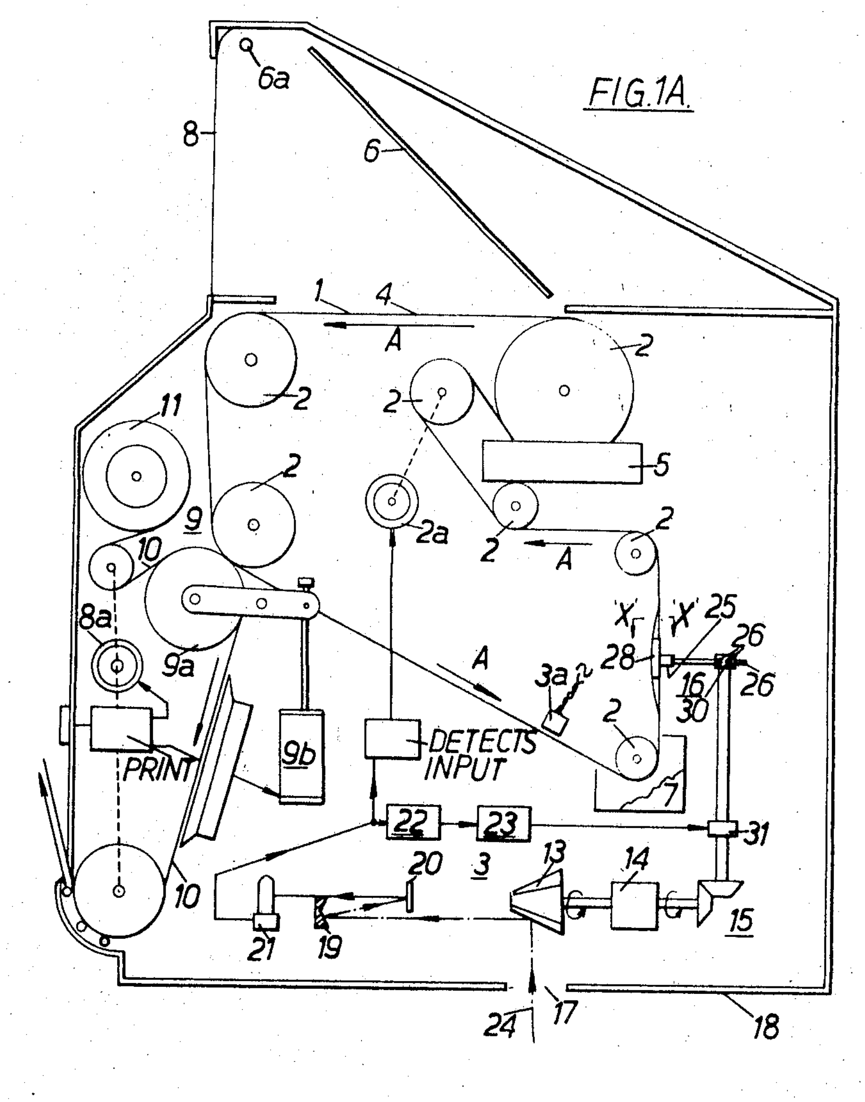
FIG. 1A shows diagrammatically apparatus according to the invention for displaying and printing information contained in signal applied thereto.

Referring now to the drawings, the apparatus shown diagrammatically in FIG. 1A is one arrangement according to the invention wherein an optical scanning mechanism, indicated generally by reference 3, is utilized which includes a mirror 13, i.e., the detector unit in the form of a prism with *n*-faces which are each inclined at 45° to the axis of ratio of the mirror, and a motor 14 for driving the prism about an axis which is parallel to an area being surveyed and for driving a magnetic recording head assembly, indicated generally by reference 16, via bevel gears 15.

Relative movement between the apparatus and the area being surveyed is such that each of the *n*-faces scans a different strip of the area, the portion of this area swept over during a single scan will hereinafter be termed a "line." Hence *n*-lines are scanned per revolution of the prism 13. In the apparatus of FIG. 1A the relative movement would be arranged such that the lines are contiguous or such that successive lines can partly over the same portion, i.e., they "overlap." Depending on the particular application "underlap" may be employed, i.e., successive lines are not contiguous, resulting in the condition where part of the area is not scanned and therefore not reproduced or presented for viewing.

Underlap would not generally be found to be desirable, since information is not obtained between successive lines. Contiguous scanning is desirable in that no part of the area being surveyed remains unscanned, and there is a certain economy in not scanning more than once over any part of the area.

Electromagnetic radiation, for example radiant energy from the area being surveyed, i.e., the primary image or the light from a source, for example from an infrared source, which is reflected by the primary image, enters the apparatus as a beam 24 via the aperture 17 in the outer casing 18 and is reflected by the prism 13 onto a parabolic collector mirror 19 (shown in cross section for clarity) which in turn deflects the beam 24 onto a flat mirror 20. The beam 24 is folded by the mirror 20 into a phototube 21; and the output of the phototube 21, which is a function of the intensity of the beam 24, is amplified by an amplifier 22 before being applied to a variable frequency square wave generator 23.

The output of the generator 23, which comprises a series of constant amplitude square wave pulses, alternate pulses being of opposite polarity and which varies in frequency by an amount which depends on the intensity of the beam 24, is applied to the recording head assembly 16 via a rotary switch 31 which forms part of the drive mechanism 30 for the recording head assembly 16.

In practice, the number of recording heads 25 is equal to the number of faces on the prism 13 but for clarity only one recording head is shown in FIG. 1A.

Figure 1B:
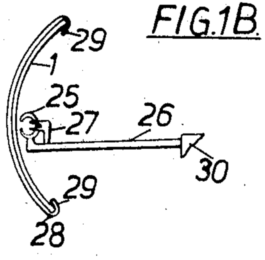
FIG. 1B shows an enlarged cross-sectioned plan view of part of the apparatus shown in the drawing according to FIG. 1A.

As can be seen in the drawing according to FIG. 1B, which is an enlarged cross-sectioned plan view on the line 'X—X' of part of the apparatus shown in FIG. 1A, each of the recording heads 25 is mounted at one end of an arm 26, the other end of which is connected to the drive mechanism 30. The terminations of the energizing coil 27 for each of the recording heads 25 is passed through or relative to the respective arm 26 and through the drive mechanism 30 to the rotary switch 31 which is arranged to energize the coils 27 when required either consecutively or simultaneously.

The display portion of the apparatus shown in FIGS. 1A and 1B includes a band 1 of magnetic tape of any convenient width—typically 9 or 12 inches—guided in a closed loop by a series of rollers 2. A motor 2*a* drives the tape loop in the direction of the arrows "A," either continuously or under the control in input signals. The magnetic recording head assembly 16 is placed adjacent to the band 1 so that when energized the individual heads 25 form a pattern of magnetic charges across the full width of the band. This pattern of charges corresponds, as will be described later in more detail, to the visible image to be presented. In order to effect the recording action it is necessary, as shown in FIG. 1B, for the band 1 to be passed through a guide member 28 at the recording position. The guide member 28 guides the band 1 by means of the formed ends 29 thereof and bends it in the form of an arc of a circle having a radius corresponding to the distance between the recording surface of the recording heads 25 and the rotational axis of the recording head assembly 16.

Thus in operation, as each face of the prism 13 scans a line one of the recording heads 25 will be rotated relative to the band 1 to form a charge pattern representative of the variations in intensity of the beam 24, which is in turn representative of the visible image to be presented.

As each of the magnetic recording heads 25 completes its scan across the band 1, the band 1 is moved by an appropriate amount in the direction of the arrows "A" in order for the next line to be recorded by the next magnetic recording head 25.

The charged band then passes through a dispenser 5 which applies to the outer surface 4 of the band a finely divided magnetic powder whose color provides adequate contrast with the background of the band. The powder adheres to the band 1 in a pattern corresponding to the pattern of magnetic charges formed by the heads 25, and renders this pattern visible. The band 1 then passes to a display position where it can be viewed in a mirror 6 arranged at 45° to the plane of the band through a window 8 in the casing 18 of the apparatus. The mirror 6 causes inversion of the displayed image, so that the pattern of charges laid down by the recording heads 25 must be initially inverted to allow for this.

The tape loop 1 completes its circuit by passing through a printing station, indicated generally by reference 9, and then to a cleansing stage 7 where the powder pattern is removed. It then returns to the magnetizing heads 25; depending on the mode of operation of the latter, a preliminary demagnetizing process, indicated in the drawing by the presence of a demagnetizing head 3*a*, may or may not be required.

Figure 2A:
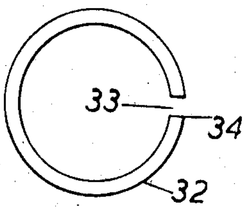
FIGS. 2A and 2B show respectively front and side elevations of a magnetic core which is used as part of a recording head assembly for the apparatus shown in the drawing according to FIG. 1A.
Figure 2B:
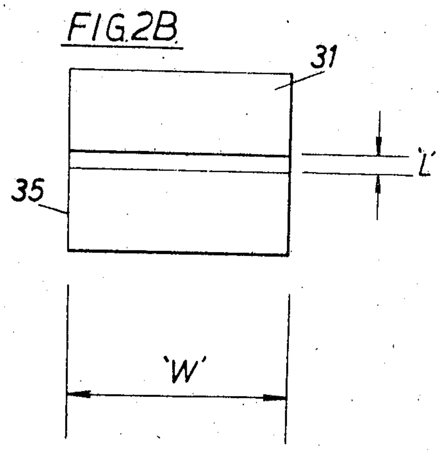

Each of the individual magnetic recording heads 25 utilize a single core 32, as shown in the drawings according to FIGS. 2A and 2B, defining a single gap 33 of width "W," i.e., the width of the lines, and length "L." The operating principle of these magnetic recording heads is such that as each of the individual heads 25 is traversed across the curved surface of the band 1, the output of the generator 23 which is applied to the energizing windings 27 and which comprises a series of constant amplitude square wave pulses, alternate pulses being of opposite polarity, causes alternate strips of the surface 4 of the band 1 to be magnetically saturated in opposite direction, the width of the strips being determined by the frequency of the generator output waveform. Since the magnetic powder will adhere to the interface of the oppositely magnetically saturated strips, the density of the powder along the length of the line being scanned will vary as a function of the intensity of the beam 24 therefore the visual image will correspond to the variations in the area being surveyed.

When the overall size of the two-dimensional magnetic image on the surface of the band 1 is such that each line to be recorder is of a width which is less than the practical minimum value to which the width "W" of the recording head according to FIG. 2 can be produced then the width "W" of the recording head would be made larger than the width of the individual lines to be recorder. Under these conditions the band 1, after the completion of the recording of each line, will be moved in the direction of the arrows "A" by an amount which is equal to the width of the line to be recorded but equal to only a fraction of the width "W." Therefore, when the next recording head is traversed across the surface 4 of the band 1, all of the preceding recorded line except the part required will be eliminated, and the next line will be impressed on the surface 4 of the band 1. Thus it can be seen from the above that, provided the trailing edge 34 of the gap 33 and the trailing end 35 of the core 32 have steep flux gradients, a high-definition two-dimensional magnetic image of any desired overall size which is transformed to a visible image by magnetically attractive powder may be obtained using this traversing method and recording head assembly.

The apparatus as so far described thus provides a means by which information received via a line scanning or picture-forming equipment, which inherently involves a mechanical scanning process, can be rendered visible. The term 'information' is here used in its widest sense and the apparatus may be used equally to display pictorial matter such as graphs, diagrams or maps, or facsimile productions of any type of original, for example the apparatus may be housed in an aircraft to survey the terrain over which the aircraft is flying.

The material of the band 1 may be similar to that of magnetic tapes used in conventional recording apparatus: a supporting band of insulating and nonmagnetic material such as a polymer film, coated on one face with a thin film of magnetic material such as an iron oxide or a nickel-cobalt alloy. While the recording heads 25 operate on the same surface of the band 1 to which the powder is applied this need not be the case. They could be arranged to operate on the opposite surface of the band 1 to the surface to which the powder is applied. This arrangement may be preferred since it reduces the possibility of abrasion of the heads 25 by residual powder; but since the magnetic coating of the film must then be on the side remote from the heads the plastics film itself must be no more than about 0.001-inch thick.

The powder applied to the band by the dispenser 5 may be any finely divided magnetic material, a ferrite powder being suitable. The individual powder grains are coated with a thermal fixing agent such as a thermoplastic resin to permit thermal fixing of a printed copy desired as a permanent record. The color of the powder is preferably dark to provide the highest possible contrast with the surface of the band 1 on which it is deposited; it is preferred to provide the band with a white, matt silver or reflecting coating, which need only be a few microns thick, to increase the contrast and hence the legibility of the displayed pattern. The band 1 may be illuminated when in the display position by the lamp 6*a*.

The printing station 9 of the apparatus includes a paper supply reel 11 from which a continuous web of paper is fed over a pressure roll 9*a* which presses it against the outer surface of the band 1, the linear speeds of band and paper being at this point the same. This pressure transfers to the paper the powder pattern carried by the band. The pattern, of course, suffers a reversal in the process but it will be recalled that this reversal has already been encountered as part of the function of mirror 6 and the pattern formed by the heads 25 takes this reversal into account. The paper web 10 is then passed through a heating device 12 which fixes the powder pattern on the surface of the paper, and is then delivered to the outside of the apparatus at a suitable delivery point.

It will be evident that if the pressure roll 9*a* is permanently biased towards its cooperating roller 2 the apparatus will print all information displayed by it as soon as the band moves round through the printing station. While this mode of operation is possible it is in general unlikely to be employed; the mode of operation envisaged is for the continuous presentation to an operator of continuously varying input data, the operator having the option of obtaining a permanent copy of any section of the displayed information he desires. For this reason the application of the pressure roll 9*a* to the cooperating band roller 2 is controlled through a solenoid 9*b*, this solenoid and the drive motor 9*c* for the paper web being under the operator's control as indicated in the diagram.

In some arrangements it will also be necessary for the operator's "Print" control to cause the primary recording band 1 to traverse through one complete pass, and at the same time to take steps to ensure that the pattern recorded on the band is not lost permanently during this printing pass.

The arrangement shown in FIGS. 1A and 1B has been described in some detail as representing a typical general layout for display and printing apparatus embodying the invention. There are, of course, numerous alternative arrangements, for example, the presentation to the viewer of the displayed information can be improved by eliminating the mirror 6 and forming the primary powder pattern on the surface 4 of the band 1 in the correct orientation for direct viewing. An additional reversal of the pattern is then required on transfer to the paper web 10.

Figure 3:
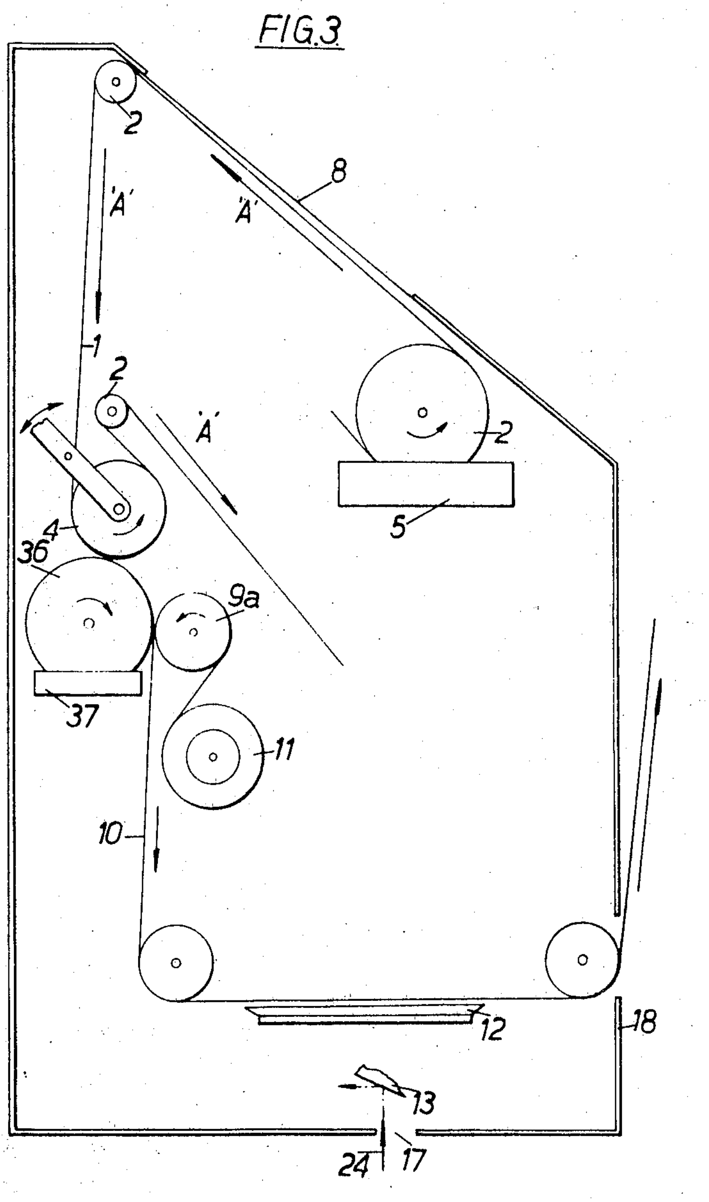
FIG. 3 diagrammatically illustrates a simplified general arrangement of a modified form of the apparatus shown in the drawing according to FIG. 1A.

FIG. 3 shows a view of the modifications necessary in the arrangement of FIG. 1A for it to operate in this way, the remainder of the apparatus remaining unchanged. It will be seen that in order to view the display in its correct orientation the window 8 has been moved to the other side of the apparatus.

The surface 4 of the band 1 after passing the viewing position 8 comes in contact with the transfer roller 36 and the powder pattern is transferred under pressure from the surface 4 to the transfer roller 36. The transfer roller 36 then comes in contact with the moving strip of paper 10 which has the same linear velocity as the transfer roller 36. The pressure roller 9*a* presses the paper strip 10 against the transfer roller 36, and the powder pattern is transferred under pressure from the transfer roller 36 to the paper surface such that it is the right way round. Any powder particles remaining on the surface of the transfer roller 36 after the powder pattern has been transferred to the paper strip 10 may be removed by vacuum extraction means 37 before the surface of the transfer roller 36 again engages the surface 4 of the band 1.

Special transfer techniques are required as the powder will not readily adhere to a conventional smooth transfer roller. The roller 36 may be recorded with a continuous mosaic of magnetic dots on a surface coating of magnetic material or the surface of the transfer roller could be made tacky with a thin coating of grease or a suitable adhesive.

The mosaic of magnetic dots would pickup the powder image from the surface 4 of the band 1 without disturbing the quality of the image. The transfer to the paper strip 10 would be effected as previously described, by pressure into the paper fibers and subsequent heating. However, the heat generated as a consequence of the pressure which is applied during transfer may prove to be sufficient to effect the thermal bonding of the powder particles which form the images, in which case the heating means 12 would not be required.

When the transfer roller 36 is provided with an adhesive coating, the adhesive may in practice be applied to the surface of the transfer roller 36 prior to it contacting the surface 4 of the band 1 by means not shown in the drawing; the adhesive facilitates the transfer of the powder pattern from the surface 4 to the surface of the transfer roller 36. The transfer of the powder pattern to a substrate, for example, the paper strip 10, to provide a permanent record would be effected as previously described for the roller having the mosaic of magnetic dots on the surface thereof. In this arrangement the vacuum extraction means shown in the drawing according to FIG. 3 would be replaced by extraction means which would remove both the grease or suitable adhesive and any powder particles remaining after the powder pattern has been transferred to the paper strip 10. After passing the extraction means more adhesive would be applied to the surface of the transfer roller 36 before it again contacts the surface 4 of the band 1.

Another alternative arrangement of the apparatus according to FIGS. 1A and 1B would be to have a detector unit, which, instead of being a single element, consists of *l*-identical elements, arranged in a closely spaced linear array; under these conditions *l*-contiguous lines will be swept out simultaneously by each face of the prism. Thus with this arrangement *nxl* lines will be scanned per revolution and it would of course be necessary to have *l*-identical recording head assemblies.

A further alternative arrangement of the apparatus according to FIGS. 1A and 1B could be arranged such that instead of magnetically saturating alternate strips of each line of the surface 4 of the band 1 in opposite directions in order to obtain the visible image, the amplified output of the phototube 21 could be applied directly to the recording head assembly 16 thereby causing each line of the surface 4 to be magnetized in varying degrees across the width of the band 1, the degree of magnetization being varied in a manner similar to the variation in the intensity of the beam 24. In this arrangement it will be necessary to have a magnetic powder formulation for the dispenser 5 which includes powder particles of various sizes. The lower the degree of magnetization of the surface 4 the smaller the powder particles will be that are attracted thereto; therefore a powder density will be created across the width of the band 1.

The dispenser 5 which forms part of the apparatus according to FIGS. 1A and 3 may be provided by any one of the fluid powder bed arrangements outlined in British Pat. No. 1,120,900 of Nov. 20, 1968.

The heating means 12 which forms part of the apparatus according to FIGS. 1A and 3 may be provided by any one of the arrangements outlined in British Pat. No. 1,170,006 of Mar 11, 1970. Alternatively, the heating means 12 may be arranged to heat the powder particles by selective absorption of light at an appropriate wavelength, for example, an infrared radiation source would heat black powder particles since they would absorb the radiant energy while the white surface of a substrate would not absorb the radiant energy.

It should be noted that the apparatus outlined in the preceding paragraphs is not limited to the electromagnetic printing process. The apparatus may be adapted for many other printing processes; for example, by suitable choice of the recording head assembly 16 the apparatus may be utilized for an electrostatic printing process, in which case the formulation of the printing powder used in the dispenser 5 would need to include either an insulating powder, a dielectric powder or a ferroelectric powder, for example, barium titanate to form the visible two-dimensional image. The methods of display, printing and thermal bonding of the powder pattern to the surface of the substrate would be exactly the same as for the electromagnetically formed images except the mechanism to effect these tasks would be somewhat different.

It is to be understood that the foregoing description of specific examples of this invention is made by way of example only and is not to be considered as a limitation on its scope.

I claim:

1. Apparatus for displaying and/or printing information received thereby, in which a latent charge pattern corresponding to the received information is created on a primary display record surface and the charge pattern is rendered visible for display as a two-dimensional image by applying a medium which adheres to the charge pattern, comprising:

a. an image conversion system including a detector unit in the form of a rotatably pyramidal prism with *n* faces inclined 45° to the rotational axis thereof, for mechanically scanning a primary image, with each of said *n* faces canning a different portion of the primary image, photoelectric means for receiving the optical intelligence representative of the primary image from said detector unit and generating in response thereto electrical signals as a function of the intensity of said optical intelligence, and a variable frequency square wave generator coupled to the output of said photoelectric means for providing a series of square wave pulses with alternate pulses being of opposite polarity, which series of pulses varies in frequency in accordance with the variation in intensity of the optical intelligence received by said photoelectric means;

b. a recording head assembly mechanically coupled to said detector unit and electrically coupled to said image conversion system, for scanning the primary display record surface in synchronism with the scanning of said detector unit to form a charge pattern on the primary display record surface which is representative of the primary image, said recording head assembly including a set of *n*-recording heads arranged equally spaced apart in the same plane, each one being mounted at one end of an arm, with the other end of the arm being connected to the rotational axis of a drive mechanism which is mechanically coupled to the rotational axis of said prism, each of said *n*-recording heads forming a different line of the charge pattern in synchronism with the scanning of each portion of the primary image by each of said *n* faces of said prism; and c. printing means for obtaining a permanent record of said information wherein the primary and permanent images as viewed are the same way round, including first means for transferring said powder image from said primary display record surface onto a surface of a substrate and causing said image to be bonded thereto, said first means having a pressure roller for pressing the substrate surface against the primary record surface, wherein when the powder image is formed in reverse on said primary display record surface said image is reversed for direct viewing by means of a mirror.

2. Apparatus as claimed in claim 1 wherein said image is bonded to said substrate surface by thermal bonding means;

3. Apparatus as claimed in claim 2 wherein said charge pattern is formed electromagnetically, and wherein said powder particles are magnetic powder particles.

4. Apparatus as claimed in claim 2 wherein said charge pattern is formed electrostatically, and wherein said powder particles are correspondingly electrostatic charge-attractable powder particles.

5. Apparatus for displaying and/or printing information received thereby, in which a latent charge pattern corresponding to the received information is created on a primary display record surface and the charge pattern is rendered visible for display as a two-dimensional image by applying a medium which adheres to the charge pattern comprising:

a. an image conversion system including a detector unit in the form of a rotatable pyramidal prism with $n$-faces inclined 45° to the rotational axis thereof, for mechanically scanning a primary image, with each of said $n$-faces scanning a different portion of the primary image, photoelectric means for receiving the optical intelligence representative of the primary image from said detector unit and generating in response thereto electrical signals as a function of the intensity of said optical intelligence, and a variable frequency square wave generator coupled to the output of said photoelectric means for providing a series of square wave pulses with alternate pulses being of opposite polarity, which series of pulses varies in frequency in accordance with the variation in intensity of the optical intelligence received by said photoelectric means;

b. a recording head assembly mechanically coupled to said detector unit and electrically coupled to said image conversion system, for scanning the primary display record surface in synchronism with the scanning of said detector unit to form a charge pattern on the primary display record surface which is representative of the primary image, said recording head assembly including a set of $n$-recording heads arranged equally spaced apart in the same plane, each one being mounted at one end of an arm, with the other end of the arm being connected to the rotational axis of a drive mechanism which is mechanically coupled to the rotational axis of said prism, each of said $n$-recording heads forming a different line of the charge pattern in synchronism with the scanning of each portion of the primary image by each of said $n$-faces of said prism; and c. printing means for obtaining a permanent record of said information wherein the primary and permanent images as viewed are the same way round, including first means for transferring said powder image from said primary display record surface onto a surface of a substrate and causing said image to be bonded thereto, said first means having a pressure roller for pressing the substrate surface against the primary record surface wherein when said image is formed on said primary display record surface such that it is suitable for direct viewing, said printing means include a transfer roller which transfers the image from said primary display record surface onto said substrate surface.

6. Apparatus as claimed in claim 5 wherein said printing means also includes a pressure roller which presses said substrate surface against the surface of said transfer roller.

7. Apparatus as claimed in claim 6 wherein the surface of said transfer roller is coated with a thin layer of grease or adhesive in order to facilitate the transferring of the powder image.

8. Apparatus as claimed in claim 6 wherein the surface of said transfer roller is recorded with a continuous mosaic of magnetic dots on a surface coating of a magnetic material thereby facilitating the transferring of the powder image without disturbing its quality.

9. Apparatus as claimed in claim 6 wherein said primary display record surface is movable relative to said recording head assembly.

10. Apparatus as claimed in claim 9 wherein said primary display record surface onto which electromagnetic charge patterns are formed is provided by one side of a magnetic tape.

11. Apparatus as claimed in claim 10 wherein said magnetic tape is a closed loop of magnetic tape.

12. Apparatus as claimed in claim 10 wherein said magnetic tape is moved relative to said recording head assembly while said image is formed thereon.

13. Apparatus as claimed in claim 12 wherein said magnetic tape is moved continuously relative to the recording means, the means for applying said powder particles to said charge pattern, the image display position, the printing means and the bonding means.

14. Apparatus as claimed in claim 10 wherein the means for depositing said medium on said display record surface are provided by a fluid bed which contains said medium.

15. Apparatus as claimed in claim 14 wherein said coating of magnetic material is either an iron oxide or a nickel/cobalt coating.

16. Apparatus as claimed in claim 15 wherein said coating of magnetic material is provided with a reflecting coating.

17. Apparatus as claimed in claim 16 wherein said reflecting coating is either a white or matt silver coating.

18. Apparatus as claimed in claim 10 wherein said magnetic tape comprises a tape of an insulating nonmagnetic material, said one side of which is coated with a magnetic material.

19. Apparatus as claimed in claim 18 wherein said electromagnetically formed charge pattern is formed on said one side of said magnetic tape by said recording head assembly which is situated either in contact with or in close proximity to the other side of said magnetic tape.

20. Apparatus as claimed in claim 19 wherein the thickness of the insulating nonmagnetic tape is of the order of 0.001 inches.

21. Apparatus as claimed in claim 18 wherein said insulating nonmagnetic material is a plastics material.

22. Apparatus as claimed in claim 21 wherein said movable primary display record surface is supported and bent in the form of an arc of a circle at the position at which said charge patterns are formed, the radius of said circle corresponding to the distance between the recording surface of said recording heads and the rotational axis of said drive mechanism.

23. Apparatus as claimed in claim 22 wherein each of said $n$-recording heads includes a single magnetic core defining a single magnetic recording gap.

24. Apparatus as claimed in claim 23 wherein the length of said recording gap is either equal to or greater than the width of the lines of said primary image.

25. Apparatus as claimed in claim 24 wherein said thermal bonding means heats the powder particles by selective absorption of light at an appropriate wavelength.

26. Apparatus as claimed in claim 25 wherein said thermal bonding means are provided by an infrared radiation source.

* * * * *